(12) United States Patent
Singh et al.

(10) Patent No.: US 9,906,691 B2
(45) Date of Patent: Feb. 27, 2018

(54) METHODS AND SYSTEM FOR SPARSE BLUE SAMPLING

(71) Applicants: Tripurari Singh, Seattle, WA (US); Mritunjay Singh, Irvine, CA (US)

(72) Inventors: Tripurari Singh, Seattle, WA (US); Mritunjay Singh, Irvine, CA (US)

( * ) Notice: Subject to any disclaimer, the term of this patent is extended or adjusted under 35 U.S.C. 154(b) by 0 days.

(21) Appl. No.: 15/079,044

(22) Filed: Mar. 23, 2016

(65) Prior Publication Data

US 2016/0286097 A1 Sep. 29, 2016

Related U.S. Application Data

(60) Provisional application No. 62/137,827, filed on Mar. 25, 2015.

(51) Int. Cl.
*G06K 9/00* (2006.01)
*H04N 1/64* (2006.01)
*H04N 1/60* (2006.01)

(52) U.S. Cl.
CPC ............... *H04N 1/648* (2013.01); *G06K 9/00* (2013.01); *H04N 1/6005* (2013.01)

(58) Field of Classification Search
CPC .. H04N 2209/046; H04N 1/58; H04N 1/6005; H04N 9/735; H04N 5/142; H04N 5/23229; H04N 5/23254; H04N 9/73; H04N 5/2176; H04N 5/357; H04N 9/646; H04N 1/648; G06T 2207/10024; G06T 5/002; G06T 5/003; G06T 5/20; G06T 3/4015; G06T 5/001; G06T 5/006; G06T 5/009; G06T 1/20; G06T 2207/20028; G06T 7/90; G01N 15/1475; G01N 2015/1472; G06K 9/4652; A61B 8/461; A61B 8/485; A61B 8/5207; A61B 8/5215; G01S 15/8977; G01S 7/52022; G01S 7/52042; G01S 7/52071
USPC ....... 382/166, 167, 275, 300, 162, 165, 197, 382/222, 276; 600/437, 438, 440, 444
See application file for complete search history.

(56) References Cited

U.S. PATENT DOCUMENTS

| | | | | |
|---|---|---|---|---|
| 5,065,229 A | * | 11/1991 | Tsai | G06T 3/4007 348/391.1 |
| 7,072,508 B2 | * | 7/2006 | Dance | H04N 1/58 382/167 |
| 9,317,930 B2 | * | 4/2016 | Kuo | G06T 7/408 |
| 2005/0276475 A1 | * | 12/2005 | Sawada | H04N 1/648 382/167 |
| 2010/0246994 A1 | * | 9/2010 | Sawada | H04N 5/3572 382/275 |
| 2011/0142366 A1 | * | 6/2011 | Young | G06T 3/4069 382/274 |
| 2011/0150331 A1 | * | 6/2011 | Young | G06T 3/4015 382/167 |

(Continued)

*Primary Examiner* — Aklilu Woldemariam

(57) ABSTRACT

A method for coding color images with fewer blue samples than samples of other colors. This provides a psycho visually high image quality since the human retina itself has fewer S cones than L, M cones. Applications include image and video coding with lower density of blue samples than other colors such as red and green. Another application is in single sensor multi-spectral and color cameras that use Color Filter Arrays. Sampling density is limited in Color Filter Arrays so that a lower blue sample density enables higher sample densities of other colors.

17 Claims, 21 Drawing Sheets

(56) References Cited

U.S. PATENT DOCUMENTS

| | | | | |
|---|---|---|---|---|
| 2012/0075493 A1* | 3/2012 | Singh | ............... | H04N 9/07 |
| | | | | 348/222.1 |
| 2013/0321672 A1* | 12/2013 | Silverstein | ............ | H04N 5/365 |
| | | | | 348/241 |
| 2013/0321679 A1* | 12/2013 | Lim | ............... | H04N 5/23229 |
| | | | | 348/256 |
| 2013/0322745 A1* | 12/2013 | Lim | ............... | H04N 9/73 |
| | | | | 382/162 |
| 2015/0042775 A1* | 2/2015 | Zhao | ............... | G06T 3/4015 |
| | | | | 348/71 |
| 2015/0296193 A1* | 10/2015 | Cote | ............... | H04N 9/646 |
| | | | | 382/167 |
| 2016/0286097 A1* | 9/2016 | Singh | ............... | H04N 1/648 |

\* cited by examiner

| G | R | G | R |
|---|---|---|---|
| R | B | R | G |
| G | R | G | R |
| R | G | R | G |

Figure 3

| G | R | G | R |
|---|---|---|---|
| R | G | B | G |
| G | R | G | R |
| R | G | R | G |

Figure 4

| G | R | G | R | G | R |
|---|---|---|---|---|---|
| R | G | R | G | R | G |
| G | R | B | R | G | R |
| R | G | R | G | R | G |
| G | R | G | R | G | R |
| R | G | R | G | R | G |

Figure 5

| G | R | G | R | G | R |
|---|---|---|---|---|---|
| R | G | R | G | R | G |
| G | R | G | B | G | R |
| R | G | R | G | R | G |
| G | R | G | R | G | R |
| R | G | R | G | R | G |

Figure 6

| G | R | G | R | G | R | G | R |
|---|---|---|---|---|---|---|---|
| R | B | R | G | R | G | R | G |
| G | R | G | R | G | B | G | R |
| R | G | R | G | R | G | R | G |
| G | R | G | R | G | R | G | R |
| R | G | B | G | R | G | R | G |
| G | R | G | R | G | R | B | R |
| R | G | R | G | R | G | R | G |

Figure 7

| W | R | W | R |
|---|---|---|---|
| G | B | G | W |
| W | R | W | R |
| G | W | G | W |

Figure 9

| W | R | W | R |
|---|---|---|---|
| G | W | G | W |
| W | R | B | R |
| G | W | G | W |

Figure 10

| W | R | W | R |
|---|---|---|---|
| G | W | B | W |
| W | R | W | R |
| G | W | G | W |

Figure 11

| W | R | W | R |
|---|---|---|---|
| G | W | G | W |
| W | B | W | R |
| G | W | G | W |

Figure 12

| W | R | W | R | W | R |
|---|---|---|---|---|---|
| G | W | G | W | G | W |
| W | R | B | R | W | R |
| G | W | G | W | G | W |
| W | R | W | R | W | R |
| G | W | G | W | G | W |

Figure 13

| W | R | W | R | W | R |
|---|---|---|---|---|---|
| G | W | G | W | G | W |
| W | R | W | R | W | R |
| G | W | G | B | G | W |
| W | R | W | R | W | R |
| G | W | G | W | G | W |

Figure 14

| W | R | W | R | W | R |
|---|---|---|---|---|---|
| G | W | G | W | G | W |
| W | R | W | B | W | R |
| G | W | G | W | G | W |
| W | R | W | R | W | R |
| G | W | G | W | G | W |

Figure 15

| W | R | W | R | W | R |
|---|---|---|---|---|---|
| G | W | G | W | G | W |
| W | R | W | R | W | R |
| G | W | B | W | G | W |
| W | R | W | R | W | R |
| G | W | G | W | G | W |

Figure 16

| W | R | W | R | W | R | W | R |
|---|---|---|---|---|---|---|---|
| G | B | G | W | G | W | B | W |
| W | R | W | R | W | R | W | R |
| G | W | G | W | G | W | G | W |
| W | R | W | R | W | R | W | R |
| G | W | G | W | G | W | G | W |
| W | B | W | R | W | R | B | R |
| G | W | G | W | G | W | G | W |

Figure 17

```
function Bp = paintBlueChrom(G, E, Y, M, radius,
sigma_d, sigma_r)
% paintBlueChrom - Paint the Blue chrominance
color
% plane using a bilateral filter
% G - the Guide image
% E - a high resolution color plane
% Y - the mosaicked
% M - masks out non-Blue locations
% radius - size of the filter kernel is
% 2*radius+1
% sigma_d, sigma_r - domain and range space
% Gaussian standard deviations assert(size(G, 1) == size(M, 1));
assert(size(G, 2) == size(M, 2));
U = zeros(size(G, 1), size(G, 2), 3);

% Normalize the guide planes
maxGuide = max(G(:));
U(:, :, 1:2) = G/maxGuide;

% Define color plane to be interpolated
U(:, :, 3) = Y-E;

% Interpolate
Bp = paintBilat(U, M, radius, sigma_d, sigma_r)+E;

end function Bp = paintBlueRatio(G, E, Y, M, radius,
sigma_d, sigma_r)
% paintBlueRatio - Paint the Blue ratio color
% plane using a bilateral filter
% G - the Guide image
% E - a high resolution color plane
% Y - the mosaicked
% M - masks out non-Blue locations
% radius - size of the filter kernel is
% 2*radius+1
% sigma_d, sigma_r - domain and range space
% Gaussian standard deviations epsilon = 1000;

assert(size(G, 1) == size(M, 1));
assert(size(G, 2) == size(M, 2));
U = zeros(size(G, 1), size(G, 2), 3);

% Normalize the guide planes
maxGuide = max(G(:));
U(:, :, 1:2) = G/maxGuide;

% Define color plane to be interpolated
U(:, :, 3) = Y./(E+epsilon);

% Interpolate
Bp = paintBilat(U, M, radius, sigma_d,
sigma_r).*(E+epsilon);

end
```

```
function B = paintBilat(U, M, radius, sigma_d,
sigma_r)
% paintBilat - Paint the sparsely sampled color
% plane of U with its other color planes as guide
% images
% U - Image containing the guide color planes and
% the sparsely sampled color plane
% M - mask the missing samples of the sparsely
% sampled color plane
% radius - size of the filter kernel is
% 2*radius+1
% sigma_d, sigma_r - domain and range space
% Gaussian standard deviations

[X,Y] = meshgrid(-radius:radius, -radius:radius);
% Determine domain filter weights
domainWt = exp(-(X.^2+Y.^2)/(2*sigma_d^2));

B = zeros(size(U, 1), size(U, 2));
for row = 1:size(U, 1)
  for col = 1:size(U, 2)

% Determine neighborhood of (row, col)
    top = max(row-radius, 1);
    bottom = min(row+radius, size(U, 1));
    left = max(col-radius, 1);
    right = min(col+radius, size(U, 2));
    V = U(top:bottom,left:right, :);
    mask = M(top:bottom, left:right);

% Determine range filter weights
    rangeWt = exp(-((V(:, :, 1)-U(row, col, ...
1)).^2+(V(:, :, 2)-U(row, col, 2)).^2)/ ...
(2*sigma_r^2));

% Combine domain and range weights and apply
mask
    F = rangeWt.*domainWt((top:bottom)- ...
row+radius+1,(left:right)-col+radius+1);
    F = F.*mask;

% Apply filter
    B(row,col) = sum(sum(F.*V(:,:,3)))/sum(F(:));
  end
end end
```

FIG. 19

METHODS AND SYSTEM FOR SPARSE BLUE SAMPLING

RELATED APPLICATIONS

This application is based on and claims the benefit of priority of U.S. Provisional Application No. 62/137,827, filed Mar. 25, 2015, which is hereby incorporated by reference in its entirety.

BACKGROUND OF THE INVENTION

Field of the Invention

Embodiments of the present invention relate to color, multi-spectral and hyper-spectral imaging systems such as still cameras, video cameras, scanners, microscopes and endoscopes and also to image and video compression systems.

Background Information

Studies of the human retina have shown that while L, M cones, corresponding to red, green are large in number, S cones, corresponding to blue, are very few and semi-regularly arranged. Furthermore it has been shown that small blue spots are not reliably seen by the Human Visual System (HVS) and appear to vanish under certain circumstances.

The so called methods of colorization have been developed in recent years that add color to monochrome images from a few pixels that do have color information. The original aim of these techniques was to aid artists in adding color to old black and white photos. (see A. Levin, D. Lischinski and Y. Weiss: Colorization Using Optimization, ACM Transactions on Graphics, vol. 23, pp. 689694, August 2004), (see G. Sapiro: Inpainting the colors, IMA Preprint Series 1979, Institute for Mathematics and Its Applications, University of Minnesota, May 2004).

A new class of image and video compression has been subsequently developed where the encoder compress luminance information conventionally and provide color information only on a selected few Representative Pixels. The decoder decompresses the luminance image and then colorizes it using color information in the Representative Pixels (see L. Cheng and S. V. N. Vishwanathan: Learning to Compress Images and Videos, Proceedings of 24th International Conference on Machine Learning (ICML), Vol. 227, pp. 161168, 2007), (see X. He, M. Ji, and H. Bao: A Unified Active and Semi-supervised Learning Framework for Image Compression, IEEE CVPR2009, pp. 6572, June 2009), (see T. Miyata, Y. Komiyama, and Y. Inazumi, Y. Sakai: Novel Inverse Colorization for Image Compression, Proceedings of Picture Coding Symposium, 2009).

Image sensors are overlaid with color filter arrays (CFA) to enable them to capture color images. A popular CFA is the Bayer pattern comprising of red, green and blue colors (see B. E. Bayer, Color imaging array, Jul. 20, 1976. U.S. Pat. No. 3,971,065).

Recently several RGBW CFAs have been proposed that contain White or transparent color filters in addition to red, green and blue (see J. T. Compton and J. F. Hamilton Jr., Image sensor with improved light sensitivity, U.S. Patent 20070024931A1, 2005). Images captured by RGBW sensors have suffered from color aliasing since each color is very sparsely sampled. This is because RGBW CFAs try to capture 4 colors as opposed to 3 colors for the successful Bayer CFA.

Recently multispectral and hyperspectral cameras have been proposed with a single sensor (see Y. Monno, M. Tanaka, and M. Okutomi, Multispectral demosaicking using adaptive kernel upsampling, Proc. of IEEE Int. Conf. on Image Processing, pp. 32183221, 2011), (see Y. Monno, M. Tanaka, and M. Okutomi, Multispectral demosaicking using guided filter, Proc. of SPIE, vol. 8299, pp. 82990O182990O7, 2012), (see L. Miao, H. Qi, R. Ramanath, and W. E. Snyder, Binary tree-based generic demosaicking algorithm for multispectral filter arrays, IEEE Trans. on Image Processing, vol. 15, no. 11, pp. 35503558, 2006).

BRIEF SUMMARY OF THE INVENTION

The present invention overcomes problems and limitations of prior imaging methods and systems by providing novel methods and systems for, among other things, sampling an image to obtain image data and processing image data.

One such method comprises receiving a sample set of data specifying sampled color planes of an original image, wherein the Blue color plane is sparsely sampled and then reconstructing its missing Blue samples to infer the original image.

In one embodiment of the above, the reconstruction of the missing Blue samples could be done by optionally computing the Blue Chrominance value corresponding to each Blue color sample, then reconstructing the missing Blue or Blue Chrominance samples by a process of upsampling or colorization using a guide image. This guide image may have one or more color planes, each of which is some function of one or more color planes of the sample set of data.

The present invention also provides a method of sampling an image by first projecting it onto an array of color selective optical transformation devices such as color filter arrays, which has fewer Blue elements than those of any other color and detecting image intensity values transmitted by this array at each sensor element of an image sensor array. The detected image intensity values are processed to infer the image.

The present invention also provides a method of compressing a color image. This is done by transforming the color planes of the original color image into luminance and chrominance color planes, sparsely sampling at least one Blue Chrominance color plane, and then compressing the resulting luminance and chrominance color planes to obtain the compressed image.

The present invention also provides a method for correcting chromatic aberration in an image. First, sparse samples of the Blue or Blue Chrominance color plane are generated. Then the Blue or Blue Chrominance samples are relocated to align more closely with other color planes. Lastly, upsampling or colorizing are applied to the Blue or Blue chrominance color planes with a guide image comprised of the other color planes.

It is to be understood that this summary is provided as a means of generally determining what follows in the drawings and detailed description, and is not intended to limit the scope of the invention. Other methods and systems are disclosed and claimed herein and those described above should not be construed as exhaustive or limiting. Objects, features and advantages of the invention will be readily understood upon consideration of the following detailed description taken in conjunction with the accompanying drawings.

BRIEF DESCRIPTION OF THE DRAWINGS

FIG. 3 is a schematic diagram showing a 4×4 RGB Color Filter Array with sparse Blue. R, G, B denote red, green and blue color filters, respectively.

FIG. 4 is a schematic diagram showing a 4×4 RGB Color Filter Array with sparse Blue. R, G, B denote red, green and blue color filters, respectively.

FIG. 5 is a schematic diagram showing a 6×6 RGB Color Filter Array with sparse Blue. R, G, B denote red, green and blue color filters, respectively.

FIG. 6 is a schematic diagram showing a 6×6 RGB Color Filter Array with sparse Blue. R, G, B denote red, green and blue color filters, respectively.

FIG. 7 is a schematic diagram showing a 8×8 RGB Color Filter Array with sparse Blue. R, G, B denote red, green and blue color filters, respectively.

Figure 9:
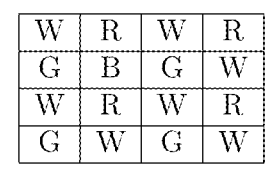

FIG. 9 is a schematic diagram showing a 4×4 RGBW Color Filter Array with sparse Blue. R, G, B, W denote red, green, blue and white (clear) color filters, respectively.

Figure 10:
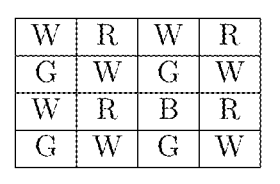

FIG. 10 is a schematic diagram showing a 4×4 RGBW Color Filter Array with sparse Blue. R, G, B, W denote red, green, blue and white (clear) color filters, respectively.

Figure 11:
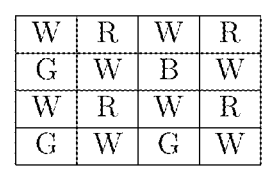

FIG. 11 is a schematic diagram showing a 4×4 RGBW Color Filter Array with sparse Blue. R, G, B, W denote red, green, blue and white (clear) color filters, respectively.

Figure 12:
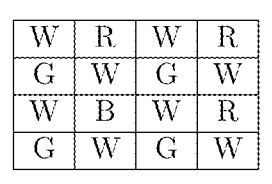

FIG. 12 is a schematic diagram showing a 4×4 RGBW Color Filter Array with sparse Blue. R, G, B, W denote red, green, blue and white (clear) color filters, respectively.

FIG. 13 is a schematic diagram showing a 6×6 RGBW Color Filter Array with sparse Blue. R, G, B, W denote red, green, blue and white (clear) color filters, respectively.

FIG. 14 is a schematic diagram showing a 6×6 RGBW Color Filter Array with sparse Blue. R, G, B, W denote red, green, blue and white (clear) color filters, respectively.

FIG. 15 is a schematic diagram showing a 6×6 RGBW Color Filter Array with sparse Blue. R, G, B, W denote red, green, blue and white (clear) color filters, respectively.

FIG. 16 is a schematic diagram showing a 6×6 RGBW Color Filter Array with sparse Blue. R, G, B, W denote red, green, blue and white (clear) color filters, respectively.

FIG. 17 is a schematic diagram showing a 8×8 RGBW Color Filter Array with sparse Blue. R, G, B, W denote red, green, blue and white (clear) color filters, respectively.

FIG. 19 is a snippet of Matlab code for upsampling a sparsely sampled Blue color plane using Joint Bilateral filtering. The function paintBlueChrom( ) assumes a low bandwidth color difference model while paintBlueRatio( ) assumes a low bandwidth color ratio model.

DETAILED DESCRIPTION OF THE INVENTION

Sparse Sampling

Figure 1:
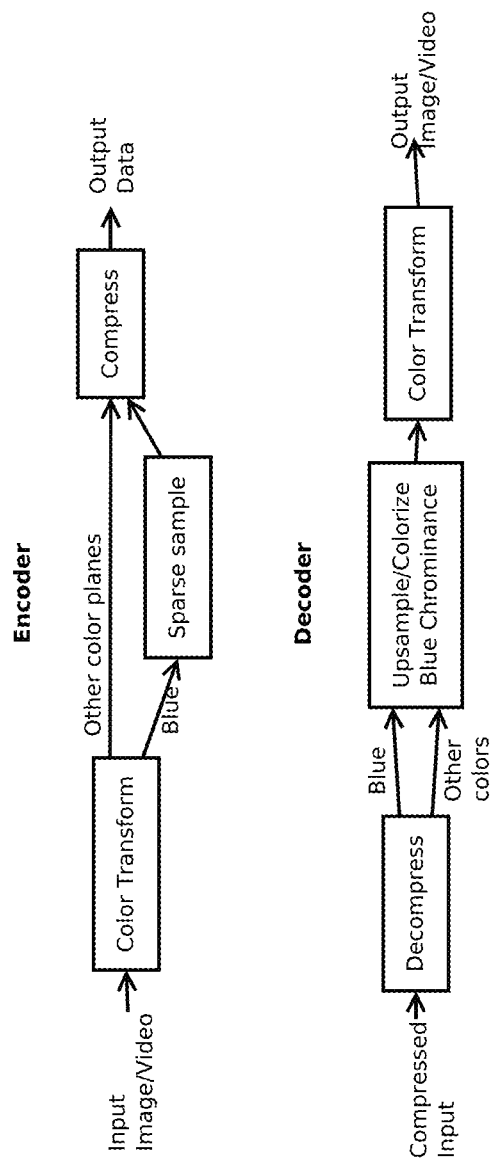
FIG. 1 is a schematic diagram showing the encoding and decoding pipelines of an image or video compression system.

This invention is motivated by the distribution of cones in the human retina. While L, M cones, corresponding to red, green are large in number, S cones, corresponding to blue, are very few and semi-regularly arranged. The small number of S cones motivates the design of an electronic imaging system that starts with a very sparsely sampled color plane and up-samples it, possibly guided by a higher resolution image in other colors. The artifacts of such an upsampling are likely to be less objectionable to the human viewer if performed on the blue color plane than any other color plane.

Imaging systems that operate in additive color spaces usually have a blue primary. For the sake of rigor, we label Blue as that primary color of the imaging system which has the largest normalized spectral overlap with the S cone of the normal human retina amongst all primary colors of the said system, where the normalized spectral overlap is defined as:

$$\text{Normalized Spectral Overlap} = \frac{\int_\Lambda f(\lambda) \cdot h(\lambda) d\lambda}{\int_\Lambda f(\lambda) d\lambda}$$

where $f(\lambda)$ is the spectral response of the primary color in question, $h(\lambda)$ is the spectral response of the S cone and $\Lambda$ is the set of wavelengths of the visible spectrum.

A color imaging system or a multi-spectral or hyper-spectral imaging system maintains several color planes of each image. The colors corresponding to these color planes in an image capture system are determined by the distinct spectral sensitivities of its elements. Each color plane is typically sampled below Nyquist rate, and so suffers from some aliasing. In this context, the Blue color plane is said to be "sparsely" sampled if it is sampled at fewer pixel locations than every other color plane. Also, any image or color plane that is sampled at more pixel locations than Blue will henceforth be referred to as a "High Resolution" color plane. Additional samples required to attain full Nyquist rate sampling for each color plane are referred to as "missing samples" for that plane.

Upsampling

The sparsely sampled Blue color plane may be upsampled with the aid of a high resolution "guide" image using a Joint Bilateral Upsampling algorithm (such as Kopf, Johannes, Michael F. Cohen, Dani Lischinski, and Matt Uyttendaele. "Joint bilateral upsampling" in ACM Transactions on Graphics (TOG), vol. 26, no. 3, p. 96. ACM, 2007) or a Guided Image Filter (such as Kaiming He, Jian Sun, and Xiaoou Tang. "Guided image filtering." In Computer Vision-ECCV 2010, pp. 1-14. Springer Berlin Heidelberg, 2010). The guide image may be luminance, a primary or secondary color plane or any function thereof. Matlab code for Joint Bilateral Upsampling is given in FIG. 19.

It is advantageous but not necessary for the guide image to contain information about the Blue color plane, an example is the white or clear color plane of a Truesense image sensor with the RGBW Color Filter Array (US 20080130991 A1, PROCESSING IMAGES HAVING COLOR AND PANCHROMATIC PIXELS).

A high resolution guide image with more than one color plane may be used for improved performance. For example a guide image with red, green and white color planes may be used.

Instead of using upsampling, the Blue color plane may alternately be reconstructed from the sparse Blue samples using a colorization algorithm such as Levin, Anat, Dani Lischinski, and Yair Weiss. "Colorization using optimization." In ACM Transactions on Graphics (TOG), vol. 23, no.

3, pp. 689-694. ACM, 2004 or Sapiro, Guillermo. "Inpainting the colors." In Image Processing, 2005. ICIP 2005. IEEE International Conference on, vol. 2, pp. II-698. IEEE, 2005.

Alternately, the sparsely sampled Blue color plane may be upsampled without a guide image, for instance using a windowed sinc kernel. Upsampling without a guide image is expected to be of lower quality than upsampling with a guide image or a colorization procedure.

Upsampling and colorization mentioned above may be performed on a color difference signal containing Blue, henceforth referred to as Blue Chrominance, instead of the Blue color plane. Color differencing reduces the required bandwidth and improves the quality of upsampling and colorization. For the sake of rigor we define Blue Chrominance=f(g(B)−h(C)), where B is the Blue color plane and C is a high resolution color plane that has been further sampled at only the Blue sample locations. f, g, h are usually linear functions, but can be non-linear functions, for instance if they include gamma correction or logarithms. Note that every Blue color plane is also a valid Blue Chrominance color plane.

Image Compression

An application of sparse Blue sampling is a coding system that uses a coarse lattice with fewer sample points for Blue Chrominance while using a fine lattice with a larger number of sample points for other color planes such as red, green, luminance etc. All color planes are then coded. The decoder reconstructs the non-blue color planes first, followed by a colorization or upsampling reconstruction of the Blue Chrominance plane usually under the guidance of the non-Blue color planes.

Another application of the sparse Blue sampling is a coding system that forgoes a predetermined lattice for blue samples but instead selects a set of Representative Pixels for which Blue is coded. If other colors, besides Blue are also coded using Representative Pixels, then they have more Representative Pixels than Blue. The decoder is provided both with the location of the Representative pixels as well as the Blue values at those pixels. Using this information, the decoder uses a colorization or upsampling algorithm to reconstruct the Blue color plane, see Cheng, Li, and S. V. N. Vishwanathan, "Learning to compress images and videos," in Proceedings of the 24th international conference on Machine learning, pp. 161-168. ACM, 2007 as well as Ono, Shunsuke, Takamichi Miyata, and Yoshinori Sakai, "Colorization-based coding by focusing on characteristics of colorization bases," in Picture Coding Symposium (PCS), 2010, pp. 230-233. IEEE, 2010.

Color Filter Array

Figure 2:
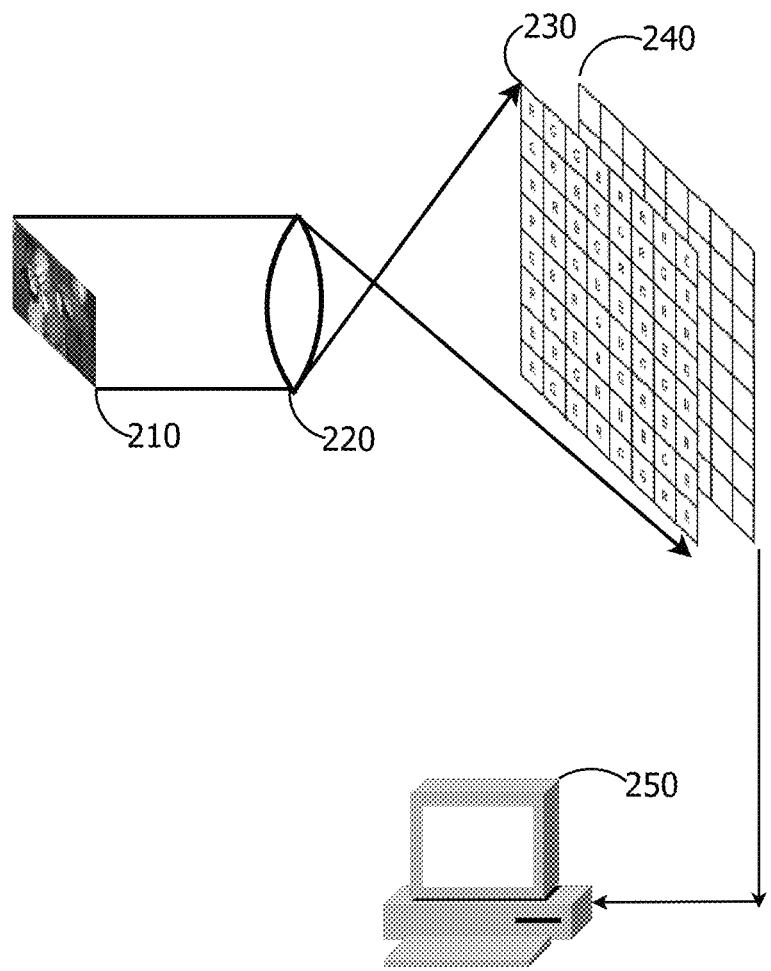
FIG. 2 is a schematic diagram showing an image capture system with a color filter array.
Figure 3:
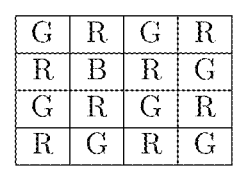
Figure 4:
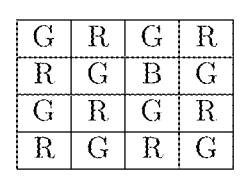
Figure 8:
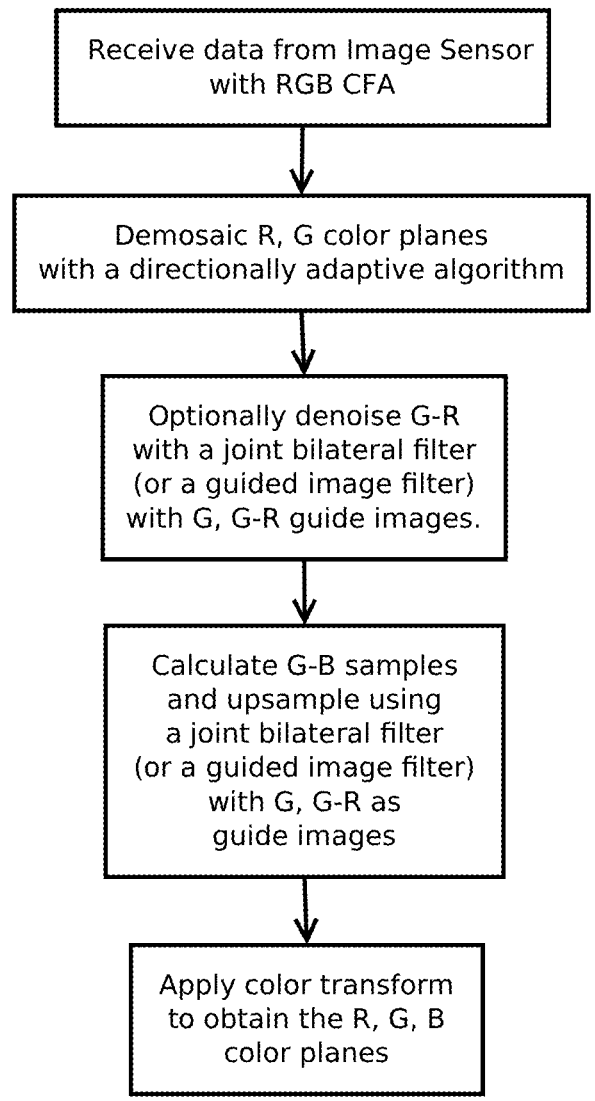
FIG. 8 is a flowchart outlining the reconstruction of images captured with the RGB Color Filter Arrays of FIG. 3-7.

An application of sparse Blue sampling is a Color Filter Array (CFA), with a low density of Blue pixels and a higher density of pixels of other colors such as red and green. A preferred embodiment is a CFA with alternate diagonals of red and green pixels with a few of the red or green pixels, or both, substituted with Blue. An example imaging system utilizing a CFA is shown in FIG. 2. Example RGB CFAs with sparse Blue are shown in FIGS. 3 through 7. Processing of data from the imaging system is outlined in the flowchart of FIG. 8.

An application of sparse Blue sampling is a CFA with a low density of randomly distributed Blue pixels and a higher density of randomly distributed pixels of other colors such as red and green.

Figure 18:
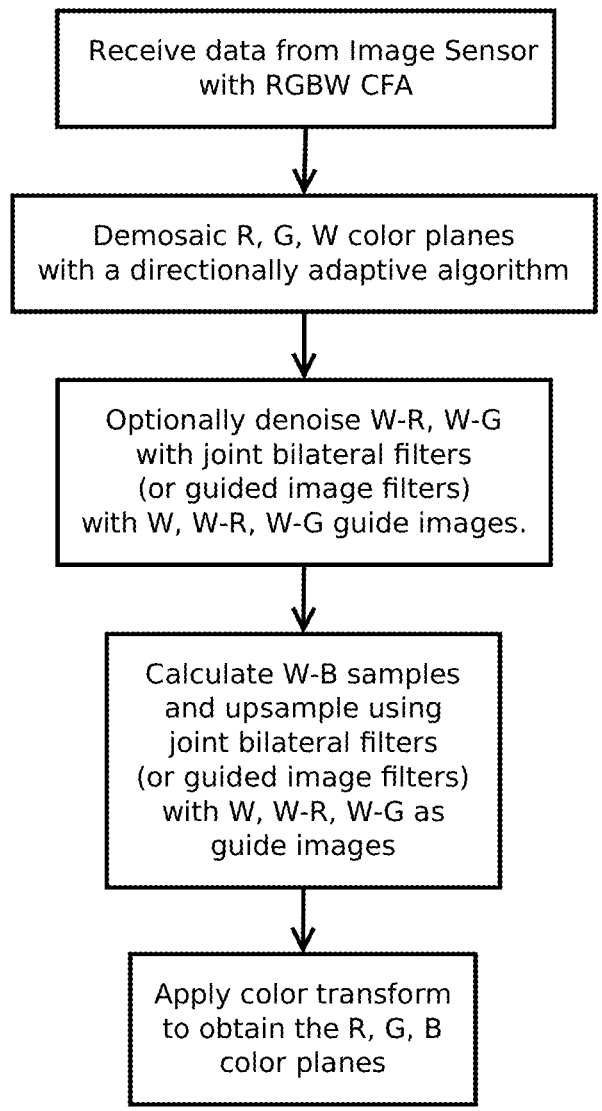
FIG. 18 is a flowchart outlining the reconstruction of images captured with RGBW Color Filter Arrays of FIG. 9-17.
Figure 20:
FIG. 20 is the simulation result of mosaicking a standard test image with the CFA of FIG. 10.
Figure 21:
FIG. 21 is reconstructed from the mosaic of FIG. 20 using a Joint Bilateral Filter and no denoising as described in FIG. 18.

An application of sparse Blue sampling is a high sensitivity Color Filter Array (CFA) containing clear pixels, also popularly known as white or panchromatic pixels. To obtain the preferred embodiment of this RGBW CFA, first substitute the green pixels in the Bayer CFA with clear pixels, and blue pixels with green pixels to obtain a regularly patterned RGW CFA. Next substitute a few of the red, green and white pixels with Blue pixels in a sparse pattern. An example imaging system utilizing a CFA is shown in FIG. 2. Example RGBW CFAs with sparse Blue are shown in FIGS. 9 through 17. Processing of data from the imaging system is outlined in the flowchart of FIG. 18. The simulation result of mosaicking a standard test image with the CFA of FIG. 10 is shown in FIG. 20. The reconstuction of the original image from the mosaic of FIG. 20 is shown in FIG. 21. The Blue color plane of FIG. 21 is reconstructed using the procedure of FIG. 18.

An application of sparse Blue sampling is a RGBW CFA with a high density of randomly distributed white pixels, a low density of randomly distributed Blue pixels and a medium density of randomly distributed pixels of other colors such as red and green.

An application of sparse Blue sampling is a hyper-spectral CFA with pixels of several different type each with its unique spectral response function, wherein the Blue pixel type is present at the fewest locations.

An application of sparse Blue sampling is a multi-sensor camera, with each sensor capturing a single color plane, wherein the Blue sensor has fewer pixels or reads out fewer pixel locations than sensors of any other color.

Chromatic Aberration Correction

Lateral chromatic aberration results in misalignment of color planes, which can be algorithmically corrected by modifying the sampling lattice. Typically one color plane is selected as the reference, and the sampling lattices of the remaining color planes are distorted to align their image features with those of the reference color plane. When used with sparse Blue sampling, the Blue samples are first relocated followed by upsampling or colorization using their new locations. Blue upsampling or colorization is more tolerant of misalignment of the Blue plane than of the color planes of the guide image. This allows the use of optics with substantial lateral chromatic aberration on the Blue plane but lower lateral chromatic aberration on the other color planes if the guide image is composed of these other color planes.

Longitudinal chromatic aberration leads to different focusing errors of different color planes. Blue upsampling or colorization is more tolerant of misfocusing of the Blue plane than of the guide image. This allows the use of optics with substantial longitudinal chromatic aberration on the Blue plane but lower longitudinal chromatic aberration on the other color planes if the guide image is composed of these other color planes.

One application is a lens design that corrects chromatic aberration to a lesser degree for the wavelengths corresponding to Blue than the other wavelengths of electromagnetic radiation captured by the system. Blue color plane is sampled sparsely and upsampled or colorized using a guide image that is a function of color planes other than Blue.

What is claimed:

1. A method of processing a multi-spectral image comprising:
    receiving a sample set of data specifying more than one sub-sampled color planes of an original multi-spectral image, wherein one of the color planes is Blue and said Blue color plane is sparsely sampled;
    determining said blue color plane as being sparsely sampled when it is sampled at fewer pixel locations than every other color plane; and
    reconstructing missing Blue samples of said original multi-spectral image, wherein said reconstructing is done by a process of upsampling or colorization with a guide image consisting of one or more color planes, wherein the color planes of the guide image are functions of one or more color planes of said sample set of data.

2. The method of claim 1 wherein said missing Blue samples are reconstructed by
optionally computing the Blue Chrominance value corresponding to each Blue color sample;
reconstructing the missing Blue or Blue Chrominance samples by a process of upsampling or colorization with a guide image consisting of one or more color planes,
wherein the color planes of the guide image are functions of one or more color planes of said sample set of data.

3. The method of claim 2 wherein said upsampling is performed using Joint Bilateral Upsampling or Guided Image Filters.

4. A method of sampling a multi-spectral image comprising:
receiving the multi-spectral image;
projecting an image onto an array of color selective optical transformation devices wherein there are fewer of said optical transformation devices corresponding to Blue selection than of any other color;
detecting image intensity values transmitted by said array of optical transformation devices at each sensor element of an image sensor, the image sensor comprising a plurality of photosensitive sensor elements configured to detect a magnitude of incident light; and
processing the detected image intensity values to infer the image, wherein the processing is done by upsampling or colorization.

5. The method of claim 4 wherein the image is inferred by:
computing a guide image consisting of one or more color planes, wherein the color planes of the guide image are functions of one or more High Resolution color planes;
optionally computing the Blue Chrominance value corresponding to each Blue color sample;
reconstructing the missing Blue or Blue Chrominance samples by a process of upsampling or colorization with said guide image.

6. The method of claim 4 wherein the optical transformation devices corresponding to Blue are periodically arranged.

7. The method of claim 4 wherein the optical transformation devices are color filter arrays.

8. The method of claim 7 wherein the color filter array consists of red, green and Blue filters.

9. The method of claim 7 wherein the color filter array consists of red, green, Blue, and white or clear filters.

10. The method of claim 9, where the color filter array pattern is obtained by substituting the green and Blue filters of the Bayer pattern with white and green filters respectively followed by substituting some of the filters with Blue filters.

11. The method of claim 4 wherein a sequence of images is sampled and inferred into a video sequence.

12. A method of compressing a multi-spectral image comprising:
receiving an original multi-spectral image;
transforming the color planes of an original color image into luminance and chrominance color planes;
sparsely sampling at least one Blue Chrominance color plane;
determining said Blue Chrominance color plane as being sparsely sampled when it is sampled at fewer pixel locations than every other color plane; and
compressing the resulting luminance and chrominance color planes to obtain the compressed image.

13. The method of claim 12, further comprising a method of decompressing the compressed image comprising:
decompressing each color plane of said compressed image;
reconstructing the Blue Chrominance color plane from its sparse samples by upsampling or colorizing it with guide images comprised of the other color planes,
applying the appropriate color transform to generate the recovered original image.

14. A method for correcting chromatic aberration in a multi-spectral image comprising;
receiving a sample set of data specifying the multi-spectral image with chromatic aberration;
generating sparse samples of the Blue or Blue Chrominance color plane;
determining said Blue or Blue Chrominance color plane as being sparsely sampled when it is sampled at fewer pixel locations than every other color plane; and
relocating the Blue or Blue Chrominance samples to align closer with other color planes; and
upsampling or colorizing the Blue or Blue Chrominance color planes with a guide image comprised of the other color planes.

15. The method of claim 14 further comprising:
providing an optical image formation apparatus which corrects chromatic aberration for the wavelengths corresponding to Blue to a lesser extent than for other wavelengths of electromagnetic radiation captured by the system;
sampling this image to obtain said sample set of data.

16. A system of processing a multi-spectral image comprising:
a data processing apparatus adapted to:
receiving a sample set of data specifying more than one sub-sampled color planes of an original multi-spectral image, wherein one of the color planes is Blue and said Blue color plane is sparsely sampled;
determining said blue color plane as being sparsely sampled when it is sampled at fewer pixel locations than every other color plane; and
reconstructing missing Blue samples of said original multi-spectral image, wherein said reconstructing is done by a process of upsampling or colorization with a guide image consisting of one or more color planes, wherein the color planes of the guide image are functions of one or more color planes of said sample set of data.

17. The system of claim 16 further comprising:
an array of color selective optical transformation devices wherein there are fewer of said optical transformation devices corresponding to Blue selection than of any other color;
an image sensor having a plurality of photosensitive sensor elements;
an optical imaging device adapted to project an image onto said array of optical transformation devices, the image sensor being disposed with respect to the optical transformation device so as to receive the optical responses of the transformation elements to the image at the photosensitive elements corresponding thereto to produce the sample set of data.

* * * * *